United States Patent [19]

Suzuki et al.

[11] 4,212,081
[45] Jul. 8, 1980

[54] PROGRAMMABLE SEQUENCE CONTROLLER WITH AUXILIARY FUNCTION DECODING CIRCUIT

[75] Inventors: Isao Suzuki, Okazaki; Toshihiko Yomogida, Kariya; Sadamu Kato, Takahama, all of Japan

[73] Assignee: Toyoda-Koki Kabushiki-Kaisha, Aichi, Japan

[21] Appl. No.: 923,205

[22] Filed: Jul. 10, 1978

[30] Foreign Application Priority Data

Jul. 29, 1977 [JP] Japan .................................. 52-91584

[51] Int. Cl.² ........................ G05B 19/28; G06F 3/00
[52] U.S. Cl. ...................................... 364/900; 364/104
[58] Field of Search ......................... 364/900, 104, 107

[56] References Cited

U.S. PATENT DOCUMENTS

| | | | |
|---|---|---|---|
| 3,798,612 | 3/1974 | Struger et al. | 364/900 |
| 3,832,696 | 8/1974 | Nakao et al. | 364/900 |
| 3,849,765 | 11/1974 | Hamano | 364/900 |
| 3,996,565 | 12/1976 | Nakao et al. | 364/900 |
| 4,021,783 | 5/1977 | Highberger | 364/900 |
| 4,025,902 | 5/1977 | Nakao et al. | 364/900 |
| 4,029,950 | 6/1977 | Haga | 364/900 |
| 4,048,622 | 9/1977 | Yomogida | 364/900 |
| 4,075,707 | 2/1978 | Wilmer | 364/900 |
| 4,122,519 | 10/1978 | Bielawski et al. | 364/900 |

*Primary Examiner*—Felix D. Gruber
*Attorney, Agent, or Firm*—Oblon, Fisher, Spivak, McClelland & Maier

[57] ABSTRACT

In a programmable sequence controller, a memory stores an auxiliary function decoding program comprising command information and address information. A comparator circuit capable of a simultaneous comparison of a plurality of bits is operatively connected to an external numerical control device to receive auxiliary function data therefrom and connected to receive address information of the decoding program for comparing the auxiliary function data with the address information of the decoding program. A logic operation circuit included in the programmable sequence contoller is operatively connected to the comparator circuit to examine the comparison result of the comparator circuit based upon command information of the decoding program, whereby the auxiliary function data is decoded.

6 Claims, 6 Drawing Figures

PROGRAMMABLE SEQUENCE CONTROLLER WITH AUXILIARY FUNCTION DECODING CIRCUIT

BACKGROUND OF THE INVENTION

1. Field of the Invention

The present invention relates to a programmable sequence controller with a circuit for decoding auxiliary function data generated from a numerical control device.

2. Description of the Prior Art

In a numerical control system, in addition to feed amount command data for controlling a feed amount of a table and the like, auxiliary function command data, such as M-function data for instructing a start or stop of a spindle, a tool exchange and the like, S-function data for instructing a rotational speed of the spindle and T-function data for instructing a tool to be selected, are programmed and stored in a command tape or a memory. The numerical control device successively reads out this program and generates feed command pulses to control a servo motor for a feed movement in each axis. However, the numerical control device merely generates signals in binary coded decimal code (BCD code) from auxiliary function terminals, when reading the auxiliary function command data. Accordingly, in order to control the above-mentioned auxiliary functions, a power control unit provided on a machine side receives auxiliary function command data to decode the same so as thereby to control relays or solenoids. A relay type control panel is conventionally used as the power control unit. In order to decode the auxiliary function command data in this relay type control panel, relays CRM1 to CRM80 and CRMF are provided to receive auxiliary function codes M1 to M80 and MF generated from the numerical control device NC, as shown in FIG. 1. The contacts of these relays CRM1 to CRM80 and CRMF are arranged in a tree-matrix to constitute a decoding circuit, as shown in FIG. 2. In substitution for the relay type control panel, a programmable sequence controller is adopted. An example of a programmable sequence controller is disclosed in U.S. Pat. Nos. 3,832,696; 3,996,565; 4,025,902; and 4,048,622, the disclosures of which are hereby incorporated by reference. In this controller, the decoding circuit of the tree-matrix, as shown in FIG. 2, is provided by a program, and accordingly, there is no need to provide a hardwired connection. However, since one auxiliary function code is usually constituted by 8 bits in BCD code, at least 8 commands are required for testing ON-OFF status of each bit. In addition, there are required a command for testing an MF signal and an output command for generating a predetermined auxiliary function instruction in accordance with a satisfaction of the test result. By way of example, a decoding program for M01 is shown in Table 1.

TABLE 1

| Memory Address | Command | Address | Meaning |
| --- | --- | --- | --- |
| n+1 | TNA | CRMF | (test under AND logic whether CRMF is ON) |
| n+2 | TFA | CRM80 | (test under AND logic whether CRM80 is OFF) |
| n+3 | TFA | CRM40 | (test under AND logic whether CRM40 is OFF) |
| n+4 | TFA | CRM20 | (test under AND logic whether CRM20 is OFF) |

TABLE 1-continued

| Memory Address | Command | Address | Meaning |
| --- | --- | --- | --- |
| n+5 | TFA | CRM10 | (test under AND logic whether CRM10 is OFF) |
| n+6 | TFA | CRM8 | (test under AND logic whether CRM8 is OFF) |
| n+7 | TFA | CRM4 | (test under AND logic whether CRM4 is OFF) |
| n+8 | TFA | CRM2 | (test under AND logic whether CRM2 is OFF) |
| n+9 | TNA | CRM1 | (test under AND logic whether CRM1 is ON) |
| n+10 | YON | CRO1 | (make CRO1 ON if test result is satisfied) |

Accordingly, at least 10 words are required for a decoding program of one auxiliary function, as shown in TABLE 1. When the number of functions to be decoded is increased, a capacity of decoding programs is increased in a memory. If an object to be sequence-controlled is complicated, the number of the memory has to be increased and it takes considerable time to prepare a decoding program, with the result of a heavy burden to a programmer.

SUMMARY OF THE INVENTION

It is an object of the present invention to provide a new and improved programmable sequence controller capable of decoding auxiliary function data in a simple manner to thereby make it easy to prepare a decoding program.

Another object of the present invention is to provide a new and improved programmable sequence controller capable of reducing a memory capacity for a decoding program.

Another object of the present invention is to provide a new and improved programmable sequence controller capable of performing a logic operation of auxiliary function data with another control condition.

Briefly, according to the present invention, these and other objects are achieved by providing a programmable sequence controller, as mentioned below. Memory means is provided for storing a sequence program comprising a train of instructions identified respectively by memory addresses thereof, each of the instructions having command information and address information therein. An input circuit is operatively connected to a plurality of addressed external input devices for converting states of the external input devices into logical values. An output circuit is operatively connected to a plurality of addressed external output devices to be energized or deenergized. A logic operation circuit is operatively connected to the memory means and to the input and output circuits for examining a logical value of one of the external input devices specified by the address information of one of the instructions based upon command information of the one instruction. Means is provided for reading out the sequence program from the memory means and feeding command information to the logic operation circuit and address information to the input and output circuits. The output circuit is operable to energize or deenergize one of the addressed external output devices in response to an output of the logic operation circuit.

In the programmable sequence controller according to the present invention, the memory means further stores an auxiliary function decoding program comprising command information and address information. A comparator circuit capable of a simultaneous comparison of a plurality of bits is operatively connected to an external numerical control device to receive auxiliary function data therefrom and connected to receive address information of the decoding program for comparing the auxiliary function data with the address information of the decoding program. The logic operation circuit is further operatively connected to the comparator circuit to examine the comparison result of the comparator circuit based upon command information of the decoding program, whereby the auxiliary function data is decoded.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which.

DETAILED DESCRIPTION OF THE PREFERRED EMBODIMENTS

Figure 3:
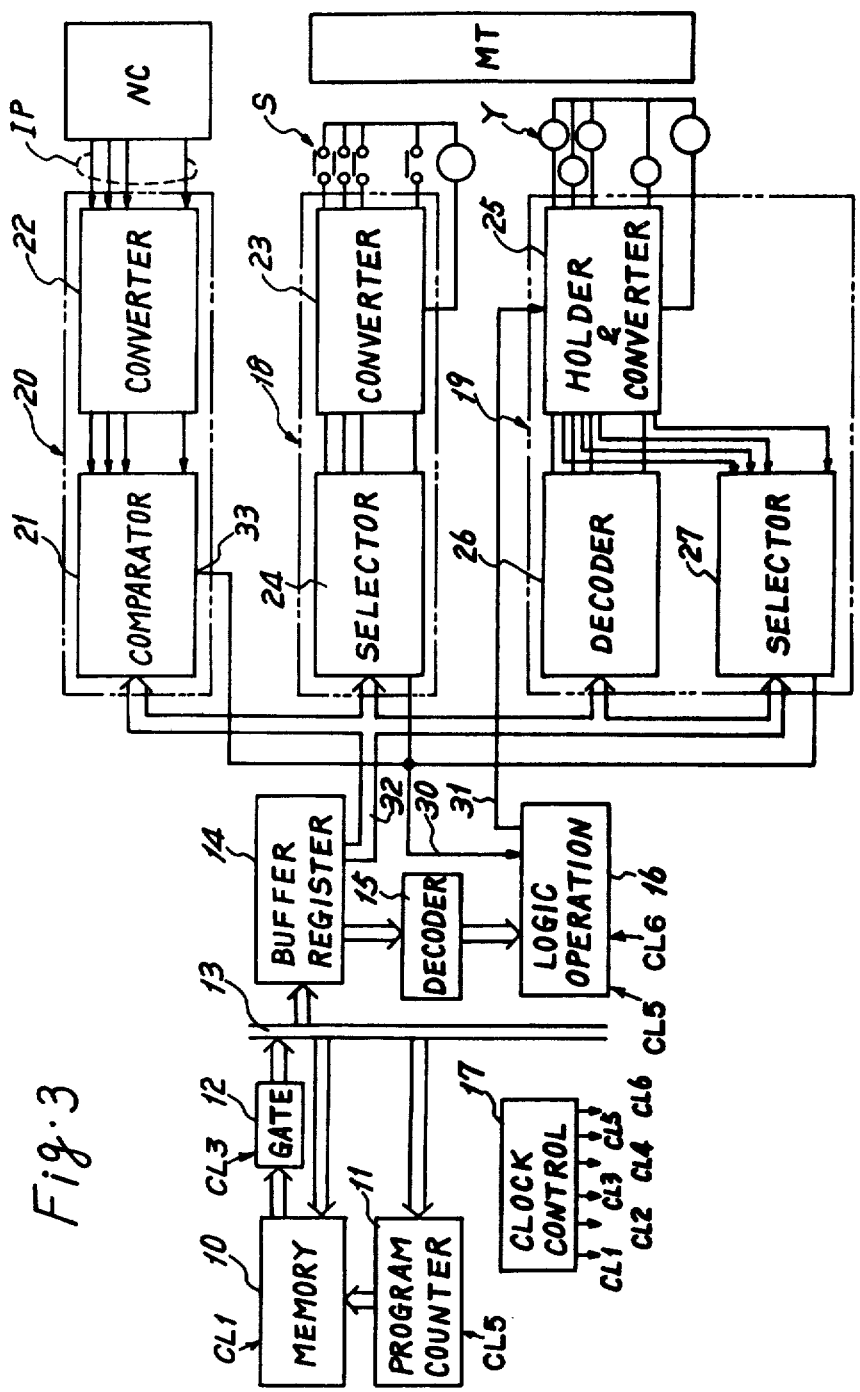
FIG. 3 is a schematic diagram of a programmable sequence controller including a decoding circuit according to the present invention.
Figure 4:
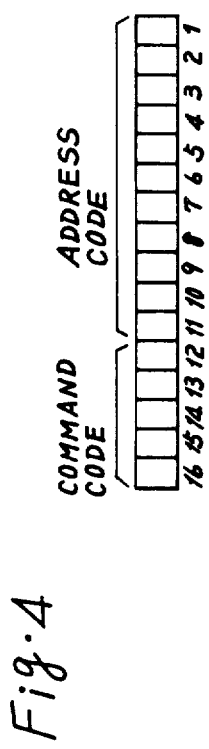
FIG. 4 shows a construction of a program of one command.

Referring now to the drawings, wherein like reference numerals or characters refer to identical or corresponding parts throughout the several views, and more particularly to FIG. 3, there is shown a programmable sequence controller including an auxiliary function decoding circuit according to the present invention. The programmable sequence controller is constituted by a memory 10, a program counter 11, a memory gate 12, a data bus 13, a buffer register 14, a decoder 15, a logic operation circuit 16, a clock control circuit 17 for generating a train of control pulses CL1–CL6, an input circuit 18 and output circuit 19. A reference numeral 20 denotes an auxiliary function decoding circuit, according to the present invention, which is constituted by a comparator 21 capable of a simultaneous comparison of a plurality of bits and a signal converting circuit 22. NC is an external numerical control device and MT is a machine tool as a controlled object. A program stored in the memory 10 includes 16-bit words, and as shown in FIG. 4, the 5 most significant bits of the word are used for a command code and the 11 least significant bits are used for an address code. The program counter 11 increments its contents each time it receives the control pulse CL5 from the clock control circuit 17. The program counter 11 designates a memory address of the memory 10 to successively read out the above-noted program at the time of generation of the control pulse CL1 which is, in turn, fed to the buffer register 14 to be stored therein through the memory gate 12 opened at the time of generation of the control pulse CL3 and the data bus 13. The 5 most significant bits stored in the buffer register 14 are used for a command, which is applied to the decoder 15 to be decoded thereby. An output of the decoder 15 is also applied to the logic operation circuit 16 to perform a logic operation based upon a command code with an input or output signal applied from the input circuit 18 or the output circuit 19, and to feed an output signal at the time of generation of the control pulse CL6 to the output circuit 19 based upon the operation result. The input circuit 18 is constituted by a signal converting circuit 23 and a signal selecting circuit 24. ON-OFF signals of external devices S such as limit switches provided on the machine tool MT are level converted by the signal converting circuit 23 and applied to the selecting circuit 24. The selecting circuit 24 selects a particular signal designated by an address code applied from the buffer register 14, which signal is applied to the logic operation circuit 16 through an input signal bus 30. The output circuit 19 is constituted by a signal holding and converting circuit 25, a decoding circuit 26 and a selecting circuit 27. The logic operation circuit 16 applies a control signal at the time of generation of the control pulse CL6 through an output signal bus 31 to the signal holding and converting circuit 26, which controls ON-OFF status of external output devices Y such as relays and solenoids provided for the machine tool MT. The decoding circuit 26 designates one of the flip flops, not shown, in the signal holding and converting circuit 25 at an address designated by an address code, so that a control signal from the output signal bus 31 is applied only to the designated flip flop in the signal holding and converting circuit 25. The selecting circuit 27 selects ON-OFF signal only at an address designated by an address code to apply the same to the input signal bus 30.

Figure 5:
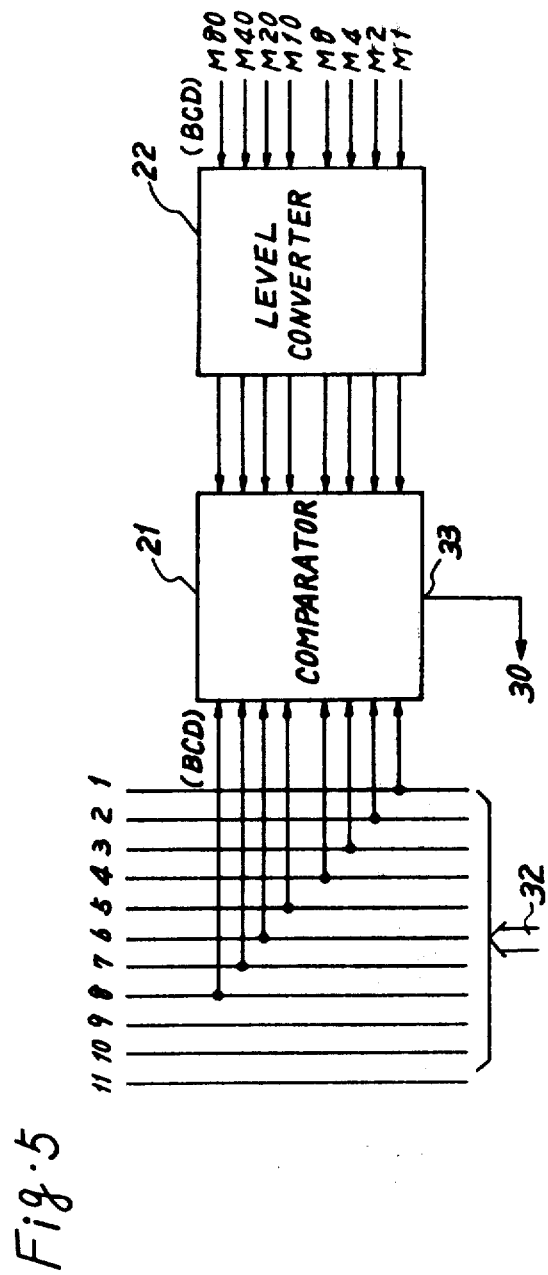
FIG. 5 shows a detail of the decoding circuit according to the present invention.

As shown in FIG. 5, input terminals IP of the auxiliary function decoding circuit 20 are connected to auxiliary code output terminals of the numerical control device NC so that code signals generated from the numerical control device NC are level converted by the signal converting circuit 22 and applied to one side of input terminals of the comparator 21. It is to be noted that if signals at the code output terminals of the numerical control device NC are at a signal level which can be directly applied to the comparator 21, the signal converting circuit 22 may be omitted. The other side of the input terminals of the comparator 21 is connected to an address bus 32 so as to be applied with address codes of the buffer register 14. An output terminal 33 of the comparator 21 is connected to the input signal bus 30 to generate a comparison result to the logic operation circuit 16.

It is to be understood that in the above-mentioned construction, the same kind of test command as those for the input and output devices are used for command codes for decoding auxiliary function data, and address codes are in BCD code in correspondence with auxiliary function data. For example, if an auxiliary function data to be decoded is M06 (tool exchange command) and the decoded result is tested under the condition of being ANDed with another control condition, TNA command (test whether input is ON under AND logic) is used for a command code and an address code is programmed as [0 0 0 0 0 0 0 0 1 1 0] (006 in BCD code). This program is read out from the memory 10 and stored in the buffer register 14. The address code is applied to the comparator 21 to be compared with auxiliary function data from the numerical control device NC. If an auxiliary function code generated is M06, the comparator 21 generates a coincidence signal or a logical ONE signal from the output terminal 33, which is applied through the input signal bus 30 to the logic operation circuit 16 to be ANDed with another control condition. If a test result of another control condition is satisfied, an output signal for making an output device ON is generated to the output circuit 19 through the output signal bus 31 by an execution of an output command so as to energize the designated output device. If the comparison result of the comparator 21 does not coincide, a non-coincidence signal or a logical ZERO signal is applied to the logic operation circuit 16 which thus decides that the test result is not satisfied. Accordingly, an output signal for making an output device OFF is generated to the output circuit 19 by an execution of an output command so as to deenergize the output device designated by the address code. In this manner, an auxiliary function code can be decoded by a decoding program of one command and a logic operation with another control condition can be performed. In the above described embodiment, test commands for the input and output devices are also used for the decoding, so that limit switches, relays and the like as input and output devices cannot be connected to the input circuit 18 and the output circuit 19 at the same address codes as those used in a decoding program. However, if test commands different from those for the input and output devices are used for the decoding and if a gate control circuit is provided in such a manner as to apply to the logic operation circuit 16 one of a comparison result signal of the comparator 21 and a signal selected by the selecting circuits 24 and 27, the input and output devices can be connected to the same addresses as those designated by the decoding program, to thereby effectively make use of the input circuit 18 and the output circuit 19. Moreover, if command codes for decoding each of auxiliary function codes M, S and T are provided, other codes than M-function can be decoded.

Figure 1:
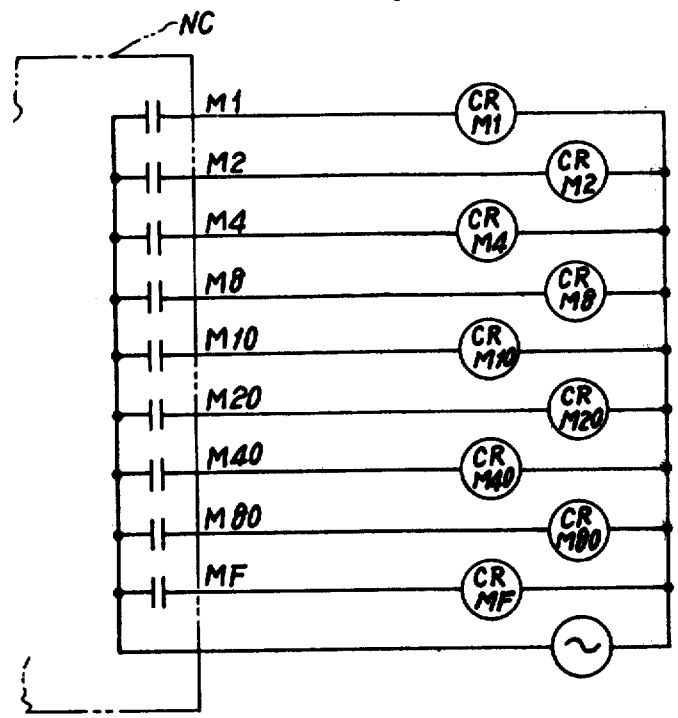
FIG. 1 is a decoding circuit in a conventional relay control panel.
Figure 2:
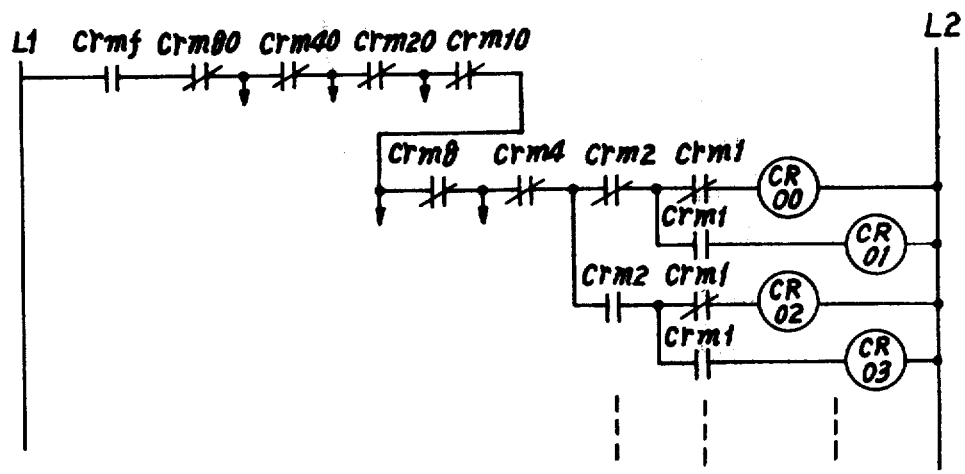
FIG. 2 is a tree-matrix of relay contacts for the decoding of auxiliary function data.
Figure 6:
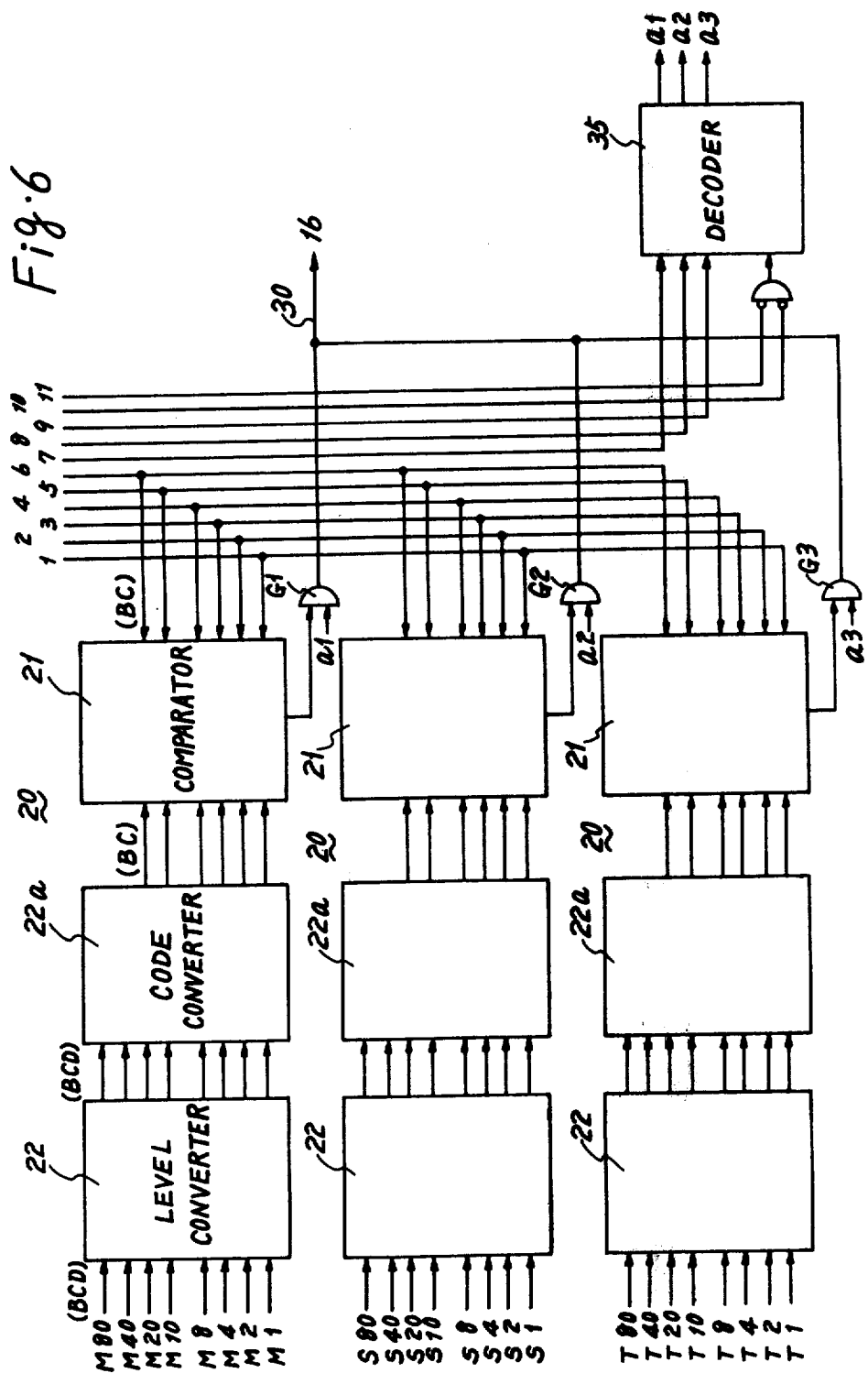
FIG. 6 shows another embodiment of a decoding circuit.

Another embodiment will now be described wherein auxiliary functions M, S and T can be decoded without providing different kinds of command codes. FIG. 6 corresponds to the auxiliary function decoding circuit 20 in FIG. 2. Code inputs applied from the code output terminals of the numerical control device NC are level converted by the signal converting circuit 22 and then converted from BCD code to a pure binary code (BC code) by a code converter 22a. The code inputs converted into the BC code are applied to the comparator 21. The auxiliary function decoding circuit 20 constituted by the comparator 21, signal converting circuit 22 and the code converter 22a is provided for each of auxiliary functions M, S and T. The output terminals of the respective comparators 21 are connected to the input signal bus 30 through gate circuits G1, G2 and G3. The gate circuits G1, G2 and G3 are connected at their input terminals to receive output signals a1, a2 and a3 from a decoder 35. The decoder 35 is connected to receive the 7 to 11th bits of an address code and generates the output signal a1, when the 7 to 11th bits in reverse order are in the [0 0 0 0 0] state, the output signal a2, when the 7 to 11th bits are in the [0 0 0 0 1] state and the output signal a3, when the 7 to 11th bits are in the [0 0 0 1 0] state.

In such a construction, a test command (TNA) is used as a command code of a decoding program, as in the previous embodiment, and an address code is applied in BC code. If it is assumed that there are 64 codes for each of the functions M, S and T, each code can be identified by 6 least significant bits (1 to 6th bits) and each of the functions M, S and T can be identified by 2 most significant bits (7 to 8th bits). The relationship between each of the auxiliary function codes and an address code is shown in TABLE 2.

TABLE 2

| Auxiliary function code | Address code | | | | | | | | | | |
|---|---|---|---|---|---|---|---|---|---|---|---|
| | 11 | 10 | 9 | 8 | 7 | 6 | 5 | 4 | 3 | 2 | 1 |
| M00 | 0 | 0 | 0 | 0 | 0 | 0 | 0 | 0 | 0 | 0 | 0 |
| M01 | 0 | 0 | 0 | 0 | 0 | 0 | 0 | 0 | 0 | 0 | 1 |
| . | | | | | | | | | | | |
| . | | | | | | | | | | | |
| M63 | 0 | 0 | 0 | 0 | 0 | 1 | 1 | 1 | 1 | 1 | 1 |
| S00 | 0 | 0 | 0 | 0 | 1 | 0 | 0 | 0 | 0 | 0 | 0 |
| S01 | 0 | 0 | 0 | 0 | 1 | 0 | 0 | 0 | 0 | 0 | 1 |
| / | | | | | | | | | | | |
| . | | | | | | | | | | | |
| S63 | 0 | 0 | 0 | 0 | 1 | 1 | 1 | 1 | 1 | 1 | 1 |
| T00 | 0 | 0 | 0 | 1 | 0 | 0 | 0 | 0 | 0 | 0 | 0 |
| T01 | 0 | 0 | 0 | 1 | 0 | 0 | 0 | 0 | 0 | 0 | 1 |
| . | | | | | | | | | | | |
| T63 | 0 | 0 | 0 | 1 | 0 | 1 | 1 | 1 | 1 | 1 | 1 |

It is to be understood that since an 8-bit address code is required for the decoding, 256 ($2^8$) input and output addresses cannot be used for the input and output devices.

Assuming that an auxiliary function code to be decoded, is S02, TNA command is used as a command code and an address code is programmed as [0 0 0 0 1 0 0 0 0 1 0]. When this decoding program is executed, the address code is applied to one side of the input terminals of each comparator 21, as in the previous case. Since the gate circuit G2 is selected by signals at 7 to 8th bits of the address code, only the comparison result of the comparator 21 applied with the code input of the S function is applied to the logic operation circuit 16 so that coincidence or non-coincidence of the comparison result is judged. In this manner, it is determined and decoded what code output is generated from the numerical control device NC and a logic operation with another control condition can also be performed. It is to be understood that an output device can be energized depending upon only the decoding result, and in such a case, the output command is programmed following the above-mentioned decoding program.

As described above, according to the present invention, various kinds of auxiliary function data can be decoded in a simple manner and a logic operation with another control condition can also be performed. Accordingly, it is possible to considerably reduce the memory capacity for the decoding program as compared with the conventional manner. Furthermore, the auxiliary function decoding circuit can be constructed in a card unit, similar to the input and output circuits and therefore can be connected through a connector in common use with the input and output circuits. This results in an advantage of optional addition and deletion.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A programmable sequence controller comprising: memory means for storing a sequence program including a train of instructions identified respectively by memory addresses thereof, each of said instructions having command information and address information therein;

an input circuit operatively connected to a plurality of addressed external input devices for converting states of said external input devices into logical values;

an output circuit operatively connected to a plurality of addressed external output devices to be energized or deenergized;

a logic operation circuit operatively connected to said memory means and to said input and output circuits for examining a logical value of one of said external input devices specified by the address information of one of said instructions based upon command information of said one instruction;

means for reading out the sequence program from said memory means and feeding command information to said logic operation circuit and address information to said input and output circuits, said output circuit being operable to energize or deenergize one of said addressed external output devices in response to an output of said logic operation circuit;

means for timing the operations of said memory means, logic operation circuit and reading out means;

said memory means further storing an auxiliary function decoding program comprising command information and address information;

a comparator circuit capable of a simultaneous comparison of a plurality of bits and operatively connected to an external numerical control device to receive auxiliary function data therefrom and connected to receive address information of said decoding program for comparing the auxiliary function data with the address information of said decoding program;

said logic operation circuit being further operatively connected to said comparator circuit to examine the comparison result of said comparator circuit based upon command information of said decoding program, whereby the auxiliary function data is decoded.

2. A programmable sequence controller as set forth in claim 1, wherein:

said auxiliary function data and address information of said decoding program are represented by a binary coded decimal code and said comparator circuit compares the auxiliary function data with a predetermined number of bits of the address information of said decoding program.

3. A programmable sequence controller as set forth in claim 1 or 2, further comprising:

a signal converting circuit operatively connected between said comparator circuit and said external numerical control device for converting the auxiliary function data into a predetermined level of signals to be used in said comparator circuit.

4. A programmable sequence controller comprising:

memory means for storing a sequence program including a train of instructions identified respectively by memory addresses thereof, each of said instructions having command information and address information therein;

an input circuit operatively connected to a plurality of addressed external input devices for converting states of said external input devices into logical values;

an output circuit operatively connected to a plurality of addressed external output devices to be energized or deenergized;

a logic operation circuit operatively connected to said memory means and to said input and output circuits for examining a logical value of one of said external input devices specified by the address information of one of said instructions based upon command information of said one instruction;

means for reading out the sequence program from said memory means and feeding command information to said logic operation circuit and address information to said input and output circuits, said output circuit being operable to energize or deenergize one of said addressed external output devices in response to an output of said logic operation circuit;

means for timing the operations of said memory means, logic operation circuit and reading out means;

said memory means further storing an auxiliary function decoding program comprising command information and address information;

a plurality of comparator circuits each capable of a simultaneous comparison of a plurality of bits and operatively connected to an external numerical control device to receive various kinds of auxiliary function data therefrom and to receive address information of said decoding program for comparing the auxiliary function data with the address information of said decoding program;

a plurality of gate means each connected to receive an output of one of said comparator circuits;

said gate means being enabled to open in accordance with the information of said decoding program to select one of the comparator circuits;

said logic operation circuit being further operatively connected to said gate means for examining the comparison result of the selected comparator circuit based upon command information of said decoding program, whereby the various kinds of auxiliary function data are decoded.

5. A programmable sequence controller as set forth in claim 4, wherein:

said various kinds of auxiliary function data are represented by a binary coded decimal code and said address information of said decoding program is represented by a pure binary code, and further comprising a plurality of code converters connected between the numerical control device and said comparator circuits for converting the binary coded decimal code of the auxiliary function data into a pure binary code.

6. A programmable sequence controller as set forth in claim 4 or 5, further comprising:

a signal converting circuit operatively connected between each of said comparator circuits and said external numerical control device for converting the auxiliary function data into a predetermined level of signals to be used in said comparator circuits.

* * * * *